United States Patent
Neiger et al.

(10) Patent No.: US 9,804,870 B2
(45) Date of Patent: *Oct. 31, 2017

(54) INSTRUCTION-SET SUPPORT FOR INVOCATION OF VMM-CONFIGURED SERVICES WITHOUT VMM INTERVENTION

(71) Applicant: Intel Corporation, Santa Clara, CA (US)

(72) Inventors: Gilbert Neiger, Hillsboro, OR (US); Barry E. Huntley, Hillsboro, OR (US); Ravi L. Sahita, Beaverton, OR (US); Vedvyas Shanbhogue, Austin, TX (US); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 433 days.

This patent is subject to a terminal disclaimer.

(21) Appl. No.: 13/629,395

(22) Filed: Sep. 27, 2012

(65) Prior Publication Data

US 2013/0117743 A1    May 9, 2013

Related U.S. Application Data

(60) Provisional application No. 61/553,108, filed on Oct. 28, 2011.

(51) Int. Cl.
*G06F 9/455* (2006.01)

(52) U.S. Cl.
CPC .......... *G06F 9/45545* (2013.01); *G06F 9/455* (2013.01); *G06F 9/4555* (2013.01); *G06F 9/45533* (2013.01)

(58) Field of Classification Search
None
See application file for complete search history.

(56) References Cited

U.S. PATENT DOCUMENTS 7,562,179 B2 * 7/2009 Brandt et al. ............. 711/6
7,941,799 B2 * 5/2011 Easton ............ G06F 12/109
718/1

(Continued)

FOREIGN PATENT DOCUMENTS

CN    1575453 A    2/2005
CN    102077188 A    5/2011

(Continued)

OTHER PUBLICATIONS

Intel 64 and IA-32 Architectures Software Developer's Manual. vol. 3B: System Programming Guide, Part 2. Mar. 2010.*
Office Action counterpart Taiwan Patent Application No. 101136211, dated Oct. 29, 2014, 8 pages, English Summary Included.

(Continued)

*Primary Examiner* — Meng An
*Assistant Examiner* — Michael Ayers
(74) *Attorney, Agent, or Firm* — Nicholson De Vos Webster & Elliott, LLP

(57) ABSTRACT

A processing core comprising instruction execution logic circuitry and register space. The register space to be loaded from a VMCS, commensurate with a VM entry, with information indicating whether a service provided by the processing core on behalf of the VMM is enabled. The instruction execution logic to, in response to guest software invoking an instruction: refer to the register space to confirm that the service has been enabled, and, refer to second register space or memory space to fetch input parameters for said service written by said guest software.

21 Claims, 7 Drawing Sheets

(56) References Cited

U.S. PATENT DOCUMENTS

| | | | |
|---|---|---|---|
| 8,370,559 B2* | 2/2013 | Schoenberg | G06F 9/45558 711/163 |
| 8,707,337 B2* | 4/2014 | Hernandez | G06F 21/53 718/1 |
| 8,732,721 B2* | 5/2014 | Iwamatsu | G06F 9/45533 718/1 |
| 2003/0120856 A1 | 6/2003 | Neiger et al. | |
| 2004/0117532 A1* | 6/2004 | Bennett | G06F 9/4812 710/260 |
| 2007/0006230 A1* | 1/2007 | Neiger | G06F 9/45533 718/100 |
| 2007/0157197 A1* | 7/2007 | Neiger | G06F 9/45533 718/1 |
| 2009/0006805 A1 | 1/2009 | Anderson et al. | |
| 2009/0070076 A1 | 3/2009 | Braunstein et al. | |
| 2009/0070776 A1 | 3/2009 | Dahlstedt et al. | |
| 2010/0174889 A1* | 7/2010 | Maliszewski | G06F 9/22 712/208 |
| 2013/0174147 A1* | 7/2013 | Sahita | G06F 9/45558 718/1 |

FOREIGN PATENT DOCUMENTS

| | | |
|---|---|---|
| EP | 1085719 A2 | 3/2001 |
| TW | 200941349 A | 10/2009 |
| TW | 201003404 A | 1/2010 |
| WO | WO 2011-114120 | 9/2011 |

OTHER PUBLICATIONS

Final Office Action from U.S. Appl. No. 13/843,337 dated Oct. 7, 2015, 12 pages.
Final Office Action from U.S. Appl. No. 13/843,337 dated Oct. 24, 2016, 16 pages.
International Preliminary Report on Patentability for Application No. PCT/US2012/058079, dated May 8, 2014, 7 pages.
Non-final Office Action from U.S. Appl. No. 13/843,337, dated Apr. 21, 2016, 14 pages.
Non-final Office Action from U.S. Appl. No. 13/843,337, dated Apr. 27, 2015, 16 pages.
Office action and Search report from foreign counterpart Taiwan Application No. 101136211, dated Dec. 30, 2015, 10 pages.
Office action and Search report from foreign counterpart Taiwan Application No. 101136211, dated May 28, 2015, 11 pages.
Office action from foreign counterpart Taiwan Application No. 101136211, dated Nov. 24, 2014, 4 pages. (English translation only available).
PCT Search Report, PCT/US2012/058079, Intel Corporation, dated Feb. 28, 2013, 11 pages.

* cited by examiner

INSTRUCTION-SET SUPPORT FOR INVOCATION OF VMM-CONFIGURED SERVICES WITHOUT VMM INTERVENTION

CLAIM TO PRIORITY

This application is related to, and claims the benefit of U.S. Provisional Patent Application No. 61/553,108, filed Oct. 28, 2011 entitled, "Instruction-Set Support for Invocation of VMM-Configured Services without VMM Intervention" which is hereby incorporated by reference herein in its entirety.

FIELD OF INVENTION

The field of invention is related to virtualization generally and CPU supported services for VM guest software specifically.

BACKGROUND

Many present day computing systems implement "virtualization". A typical implementation is illustrated in FIG. 1. As observed in FIG. 1, a layer of software 102 is imposed between the operating system 101 software and the CPU 103. This layer of software 102 typically includes one or more virtual machines (VMs) 102a_1-102a_N that "run on top" of a virtual machine monitor (VMM) 102b. Although not a strict requirement, FIG. 1 shows a common arrangement where different software application instances 100_1-100_N are each provided with its own operating system instance 101_1-101_N that runs on top of a dedicated virtual machine 102a_1-102a_N.

A VM presents the appearance of a CPU to the software that runs on it; such software is often known as "guest" software. As a consequence, at least as a first approximation, the software running on the virtual machine may "think" that it has the resources of an entire computer system to itself. The VMM 102b is responsible for supporting multiple VMs on an underlying CPU 103. As such, the VMM 102b coordinates the concurrent requests/needs of the multiple VMs on the CPU 103. This includes correlating allocations of actual resources of the underlying computing system (e.g., CPU threads, system memory space, disk drive storage space, etc.) to the "virtual" computing system resources that the software running on the VMs refer to.

While guest software normally "thinks" that it running on its own computer system with no VMM, it is also possible for such software to be designed to know when it is running in a VM supported by a VMM. Such software is sometimes called "paravirtualized" or "enlightened." Software that "knows" it is running on a VMM (e.g., in one of the VMs 102a_1-102a_N) may be designed to directly invoke certain "services" provided by the VMM 102b. Presently, however, in order to invoke a VMM service, control of the CPU must first pass to the VMM from the VM in which the application/OS instance making the invocation is running; this control transfer is sometimes referred to as a "VM exit". One possible consequence of a VM exit is that the CPU must "switch" its active context or state from that of the VM's process to that of a VMM process. After the service has been completed, the CPU must again switch its active context/state back from the VMM process to the VM process; this return control transfer is sometimes referred to as a "VM entry."

FIG. 2 shows a prior art process for invoking a VMM service. As observed in FIG. 2, an application/OS instance recognizes a need to invoke a VMM service 201. Prior to the invocation, the application/OS instance may populate 202 registers and/or memory with values that identify the specific service being invoked and the service's input parameters. To then invoke the VMM service, the application/OS instance executes an instruction 203 for invoking the VMM service. For example, in the case of present day Intel processors having VT-x technology, the application/OS instance executes the VMCALL instruction, which was designed for calling the VMM explicitly from a process that is being run on a VM. (The application/OS instance might instead use another instruction, such as CPUID or WRMSR, that causes VM exits and that the VMM has enabled for this purpose.)

In response to the VMCALL instruction being executed, control of the CPU is transferred from the VM to the VMM 203 (VM exit). In operation, microcode within the CPU implements the aforementioned context/state switching by moving the context/state information of the VM from software visible CPU register space to the Virtual-Machine Control Structure (VMCS), which has been configured by the VMM, and reloading much of these same software visible registers with context/state information for the VMM process from elsewhere in the VMCS.

The VMM process refers to the memory or register values established by the invoking application/OS instance to understand what service is being requested and to accesses the service's input parameters. The VMM process then executes the service 204. This is accomplished by executing VMM program code written to perform the service.

After the service is completed, control transfers back from the VMM to the VM by way of a VM entry 205. Here, CPU microcode loads the VM context/state from the VMCS into the software visible register space.

An example of a VMM service is a "guest address space switching" service. This service may be useful to guest software running in virtual machines for which a VMM supports multiple address spaces, as explained in the following paragraphs.

A VMM typically supports, for each of its VMs, a "guest address space". This is a mapping from the addresses that the guest "thinks" are physical (guest-physical addresses) to true physical addresses that can be used to access memory; the mapping may also specify access rights (e.g., read/write, read-only, etc.) for each guest-physical address. In the case of present day Intel processors having VT-x technology, guest address spaces may be implemented using extended page tables (EPT).

In the absence of paravirtualization, a VMM will typically support a single guest address space per VM. If guest software is paravirtualized, a VMM may establish multiple guest address spaces for a single VM, although only one will be active at a time. In one example, these address spaces may differ from each other with regard to how different regions of memory are protected. There might be a different guest address space for each application module running in the VM; the guest address space for a module might allow the module to access its own memory but not the memory belonging to other modules.

For a VM supported by multiple guest address spaces, the VMM will need to change which guest address space is active when appropriate. An efficient mechanism is for guest software to inform the VMM when to change the guest address space (e.g., when the guest OS is changing from one application module to another). Guest software can inform the VMM via a "guest address space switching" service.

As noted earlier, the VMCALL or other instruction can be executed to call the VMM for the guest address space switching service. Prior to execution of the instruction, the guest software may place a value in a register (e.g., an EAX register) or memory to identify the "guest address space switching" service. An identifier of the address space to be switched to may be specified in an additional register (e.g., the EBX register) or in memory. The instruction causes a VM exit, and the service is performed as described above by the VMM.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The fact that a VM exit occurs every time guest software invokes a VMM service corresponds to a form of inefficiency. Specifically, as described above, significant register content movement needs to take placed between software visible register space and the VMCS in order to switch the context/state of the program flow from that of the VM to that of the VMM.

One way to avoid a VM exit is to embed the functionality of the service in the CPU rather than in the VMM. Here, because the CPU rather than the VMM is performing the requested service, no transfer of control or context switching within the CPU to is required. In various embodiment, although the VMM no longer performs the service, the service is configured by the VMM. In an embodiment, guest software invokes the service via a specific instruction. This may be one of some number of existing instructions that are redefined to invoke the service by the CPU, or it may one of some number of new instructions specifically defined to support VMM-configured services. The immediately following discussion of FIG. 3 discusses an embodiment in which this new approach is implemented with a single new instruction, VMFUNC, which is built into the instruction set of the CPU.

Figure 1:
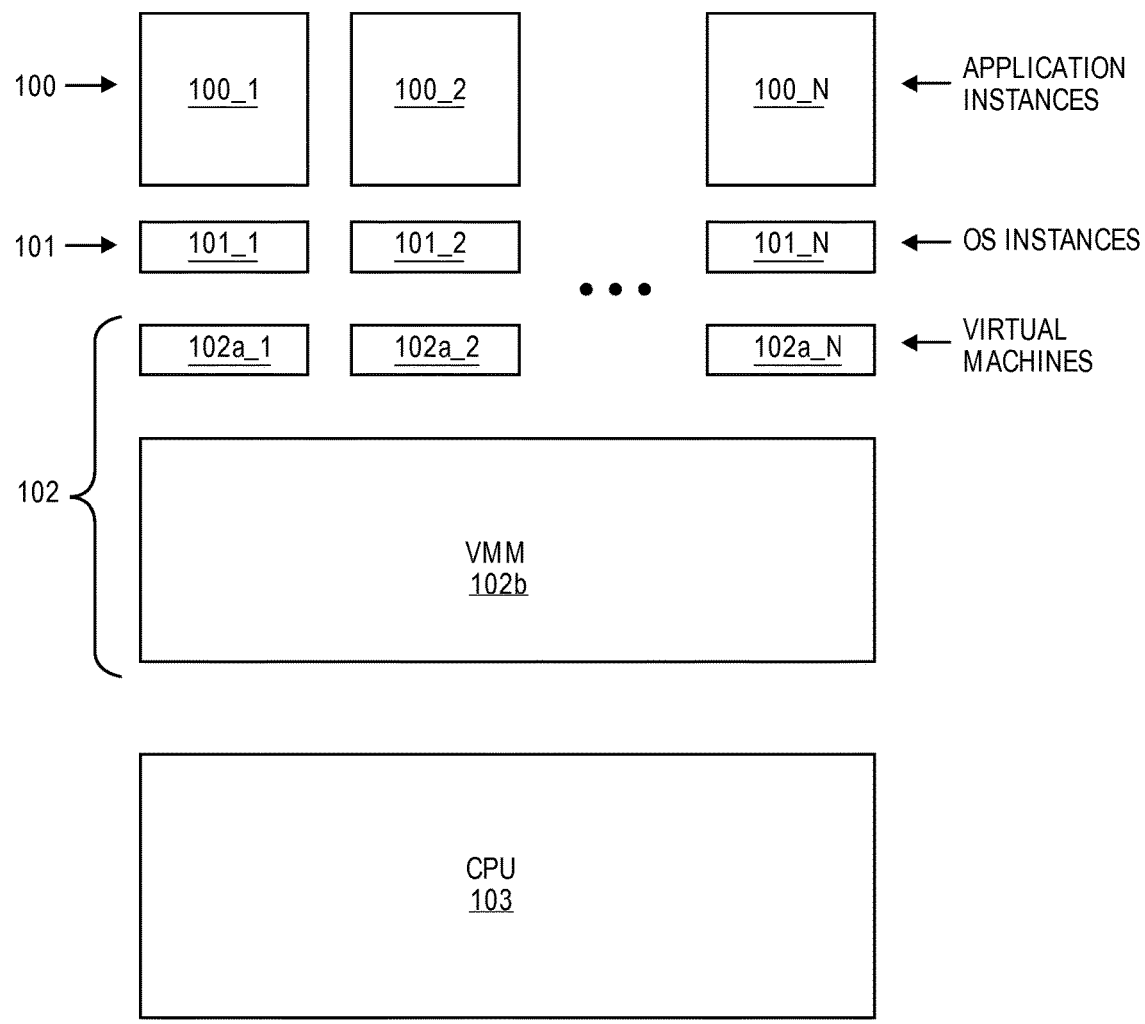
FIG. 1 shows a virtualization scheme (prior art)
Figure 2:
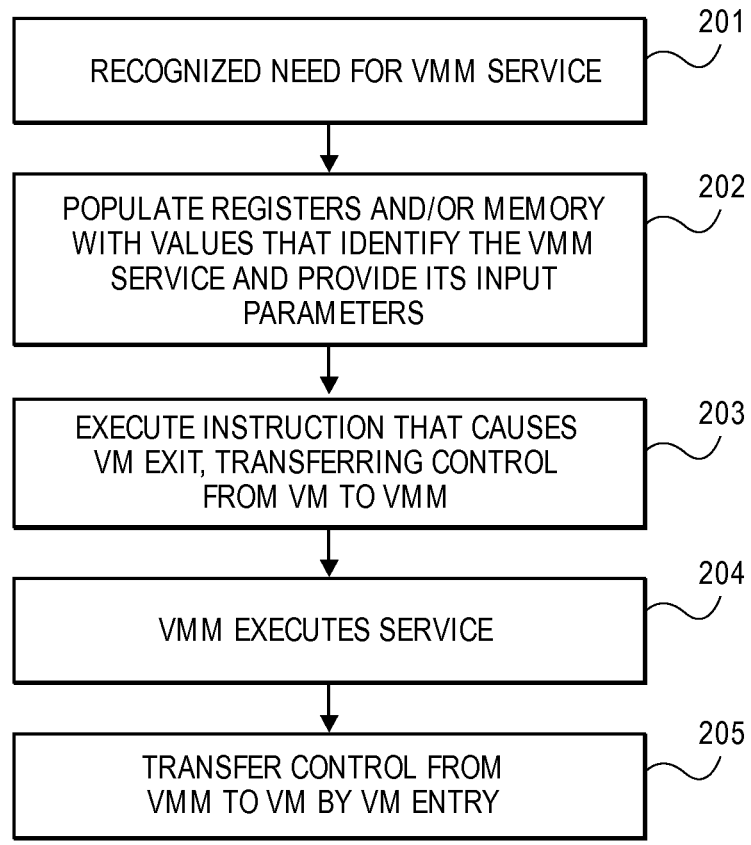
FIG. 2 shows a process for invoking a VMM service from guest software (prior art)
Figure 3:
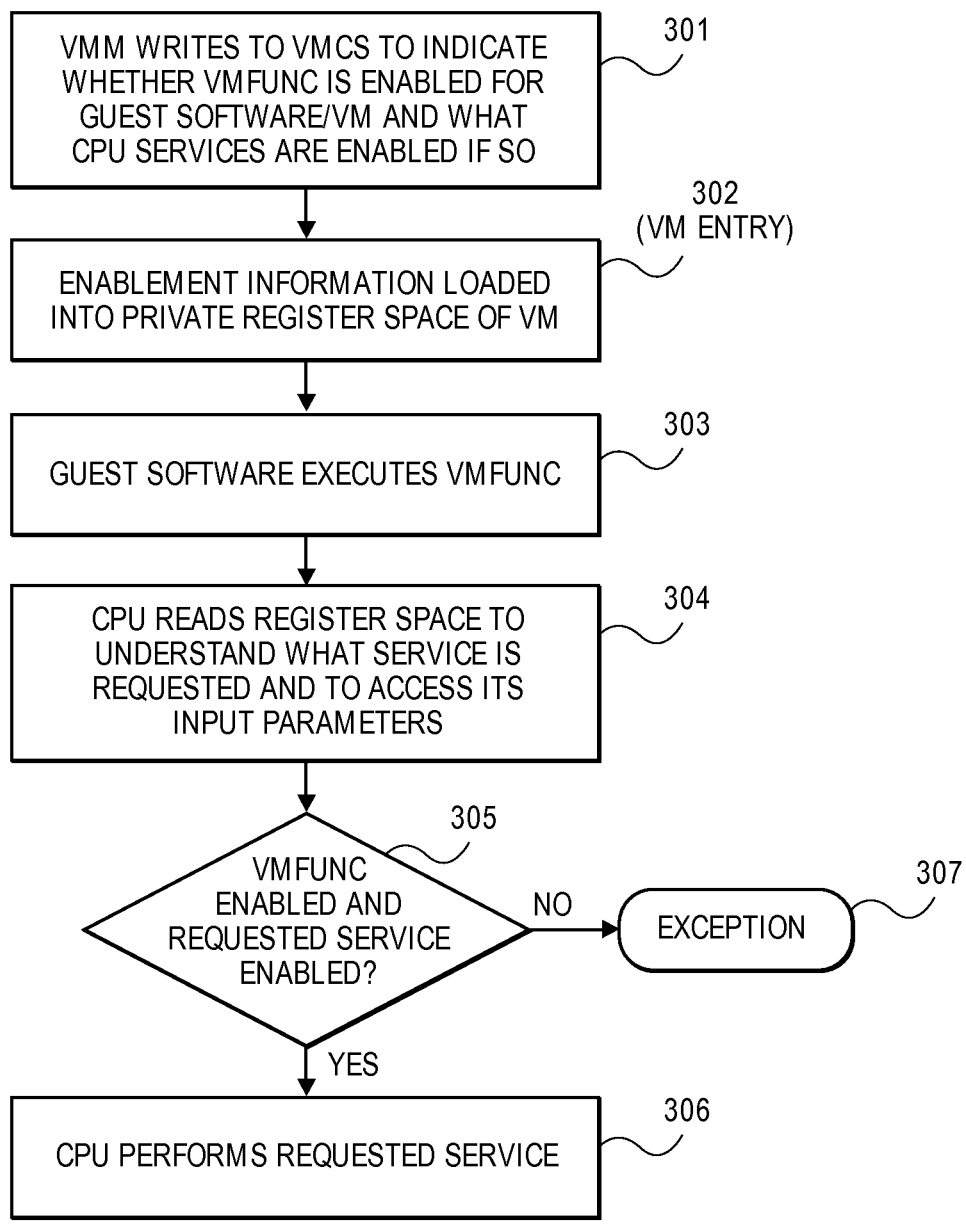
FIG. 3 shows a process for invoking a CPU provided service from guest software.

FIG. 3 shows a process flow for the configuration and use of a VMFUNC instruction. As observed in the process of FIG. 3, during an initial configuration for a specific instance of guest software or a VM, the VMM indicates 301 (e.g., by writing into the VM's VMCS) whether VMFUNC is enabled for the guest software/VM, and, if so, which particular CPU provided services are enabled for the guest software instance/VM. The next VM entry 302 loads this configuration information from the VMCS into the CPU's private control register space (i.e., space not visible to guest software). For simplicity the discussion below is presented as if the configuration information kept in VMCS is specific to a particular instance of guest software, however, the reader should understand that this information may also be specific to a VM that guest software runs on.

In this embodiment, guest software wishing to invoke a VMM configured service first loads the EAX register with a value that identifies the service it wishes to invoke. If appropriate, the guest software loads other registers (e.g., the EBX or ECX registers) with relevant information (e.g., input parameters) pertinent to that service. After these registers have been loaded, the guest software executes the VMFUNC instruction 303 to invoke the service.

Although the above discussion describes a process by which the enabling of each service for a VM is specified in the VMCS and guest software identifies the desired service by writing to on die processor registers, the reader will understand that any such configuration information and/or guest software service invocation can be made alternatively or in combination through memory.

In response to the execution of the VMFUNC instruction, instruction execution logic within the CPU examines the information in the EAX register to understand what specific service is being requested and, if appropriate, other registers to obtain the applicable input information 304.

The instruction execution resources of the CPU then look 305 to the private control registers that were earlier loaded 302 with VMCS information upon VM entry to see whether VMFUNC is enabled for the guest software and, if so, whether the specific service that has been requested by the guest software has also been enabled. If VMFUNC has not been enabled for the guest software, or, if VMFUNC has been enabled but the specific requested service has not been enabled, the CPU hardware raises an exception 307. If both VMFUNC and the requested service have been enabled, the CPU's instruction execution resources perform the service 306.

Some embodiments may limit some or all services to specific privilege levels or operating modes. Such embodiments may check the privilege level and/or operating mode before or after checking that VMFUNC and the requested service have been enabled. If the CPU is not operating at the proper privilege level and operating mode, the CPU may generate an exception or a VM exit.

When the VMFUNC instruction performs an invoked VMM configured service, all processing occurs without switching contexts between the VM process and a VMM process; this is in contrast to the prior-art approach of causing a VM exit using the VMCALL instruction (or other instructions that cause VM exits).

In an embodiment, the private register space for an instance of guest software (loaded from the VMCS) includes an EPT page-table pointer-address that points to the EPT page-table hierarchy for address translations to be performed for the guest software that is running on the VM (i.e., for the current guest address space). Here, the translations in the EPT page-table hierarchy define the (potentially multi-step) translation process from physical addresses specified by the guest software ("guest-physical addresses") to the physical addresses in system memory where the data/instructions associated with the specified addresses actually reside, as well as the access rights with which guest software may access those physical addresses.

Different components of guest software (e.g., two different applications or two different software modules of a same application) may access different physical locations of system memory. A VMM may provide protections between those components by associating each such component with its own EPT page-table hierarchy. For example, if the guest software corresponds to an OS instance, the OS kernel can arrange to have different modules of the OS (including modules that are plugged into the OS such as drivers)

operate from different memory address spaces, protecting each module from others within the same OS instance. For instance a driver may be configured to access one portion of physical memory and other modules of the OS instance, such as the OS kernel, could be configured to access a second portion of physical memory. By further making the OS kernel's memory space read-only, the OS kernel could be protected from other less trusted software modules (such as the driver).

Changing the EPT page-table pointer-address, kept in the private register space and in the VMCS, changes which EPT page-table hierarchy, and therefore which translation scheme, is utilized for the VM's active guest software. According to one embodiment, the VMFUNC instruction is used to change the EPT page-table pointer-address without a VM exit. As program flow flows through the various software modules of the guest software, VMFUNC is executed on transitions between the software modules to setup their appropriate respective address spaces. For instance, when program flow flows from the OS kernel to the driver, VMFUNC is executed as part of the transition to set up the driver's address space. Likewise, when program flow flows back to the OS kernel from the driver, VMFUNC is again executed on the transition to switch back to the OS kernel's address space.

Recall at step 302 of FIG. 3 that the private register space is loaded from VMCS by VM entry. In an embodiment, if a guest-address-space switching service is to be enabled for the guest software, an address in the VMCS that identifies a "table of pointers" is also loaded into the private register space from VMCS. The table of pointers corresponds to the collection of different page table hierarchies that may be utilized from the guest software. In an embodiment the table of pointers is pre-configured by the VMM.

Figure 4A:
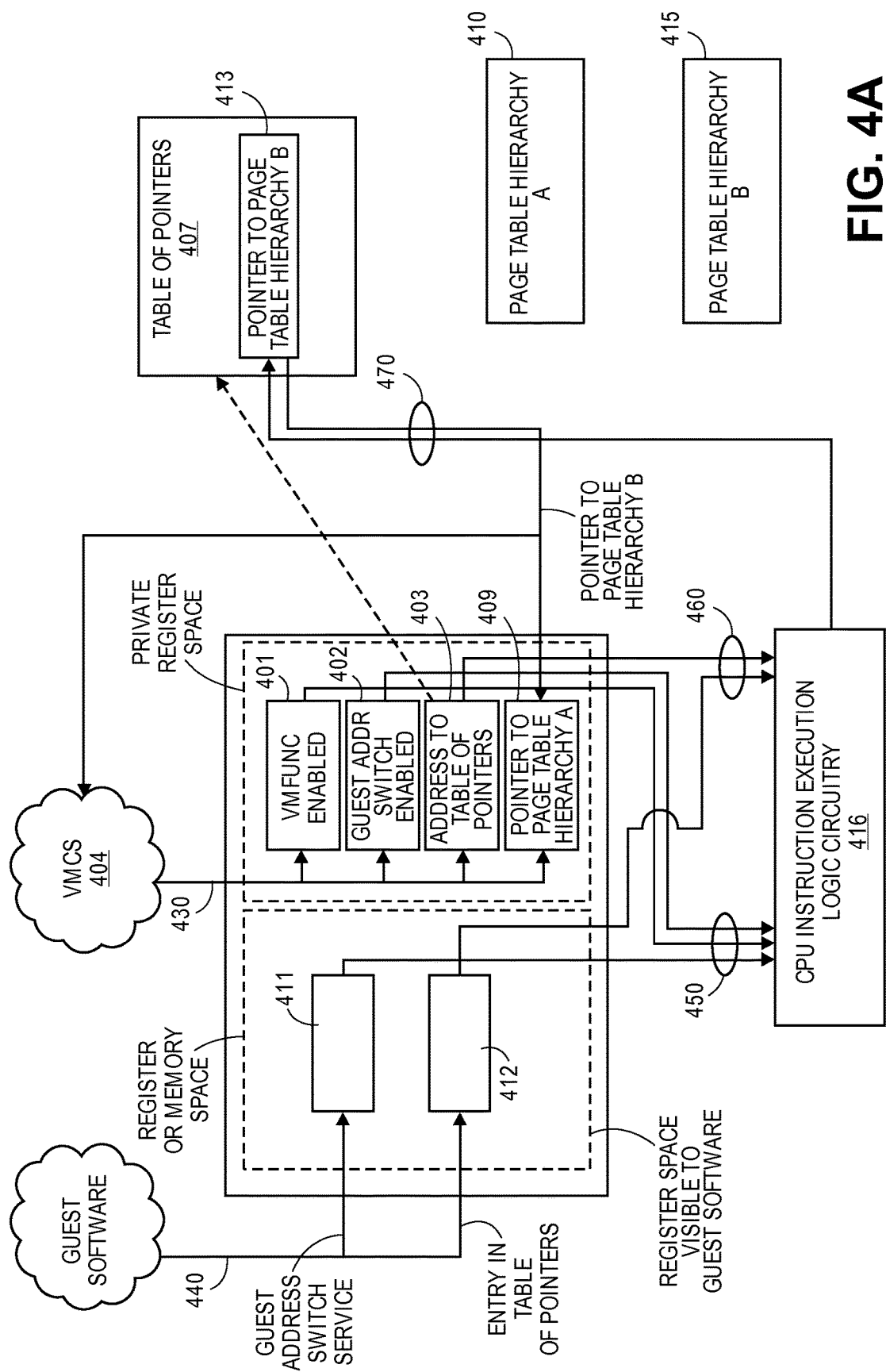
FIGS. 4*a* and *b* show a CPU provided guest address switching service.
Figure 4B:
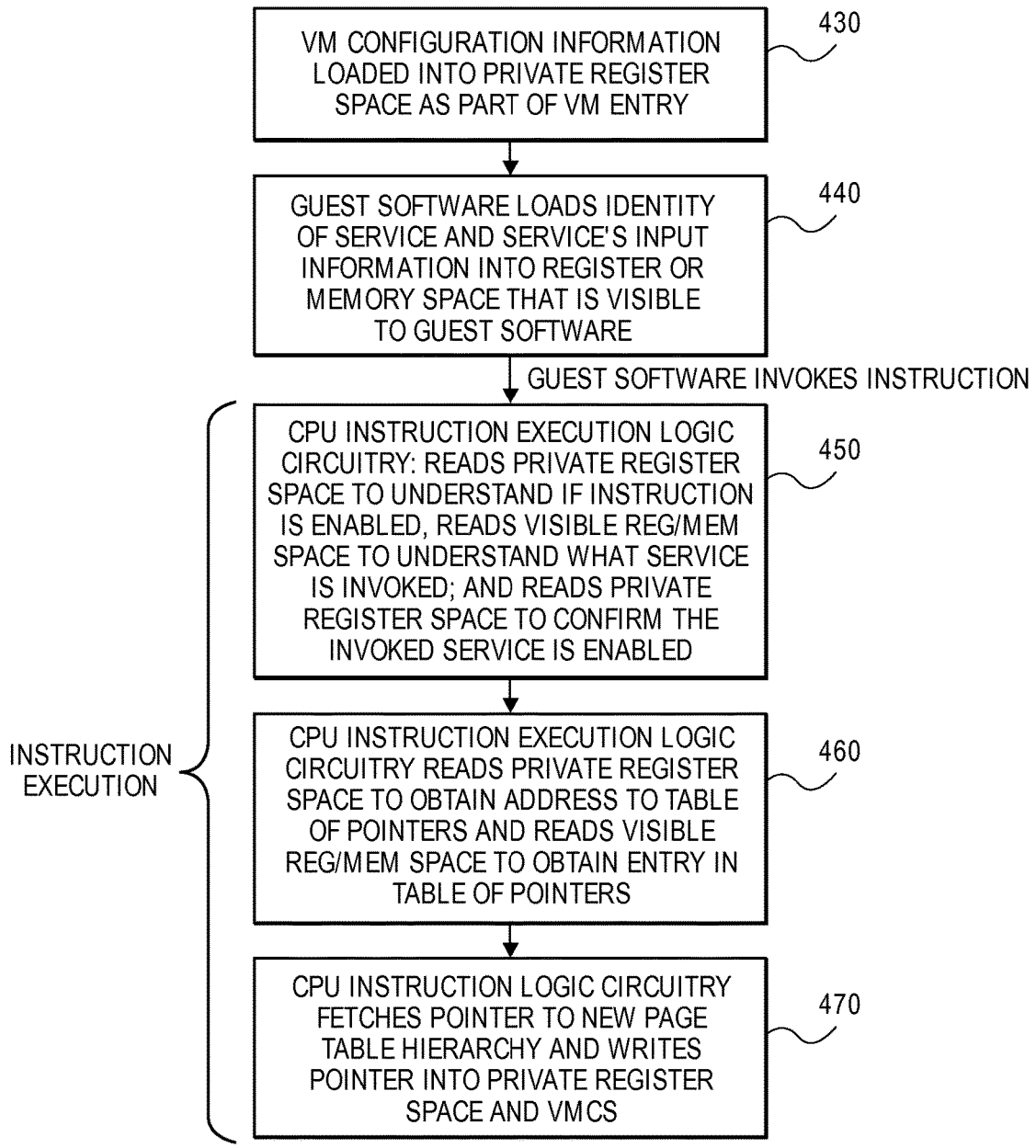

FIGS. 4a and 4b pertain to an embodiment of implementing a guest-address-switching service in CPU hardware. FIG. 4a is drawn from the perspective after which VM entry 430 has occurred and, as part of the VM entry process, private control register space 401, 402, 403 has been loaded by the CPU 430 with information from the VMCS 404 that specifies the following: i) whether VMFUNC has been enabled 401; ii) whether guest address switching has been enabled 402; iii) the address 403 of the table of pointers 407; iv) a pointer 409 to an initial page table hierarchy A 410.

While the guest software is executing, the page-table pointer-address located in private register space 409 points to the page-table hierarchy 410 that includes the proper address translation information for the guest software. Subsequently, the guest software decides to execute the VMFUNC instruction to invoke the guest address switching service. In setting up the input parameters for the VMFUNC instruction 440, a location in memory or a register (in an embodiment, the EAX register 411) is loaded with a value that identifies the guest address switching service and a second location in memory or register (in an embodiment, the ECX register 412) is loaded with a value that identifies an entry 413 in the table of pointers 407 where the page-table pointer-address 414 for the address space being switched to (represented by page table hierarchy B 415) is located.

In executing the instruction, CPU execution unit resources 416 first read 450 register/memory space 411 to understand that the guest-address-switching service is being invoked and private register space 401 and 402 to check whether VMFUNC has been enabled for the guest software and, if so, whether guest-address-switching has been enabled for the guest software. After confirmation that both VMFUNC and guest-address-space switching has been enabled, CPU execution unit resources 416 next read 460 register space 403 (the address of the table of pointers) and register/memory space 412 (indicating a chosen entry in the table of pointers) to fetch a new page-table pointer-address 414 (at entry 413 in the table of pointers 407), load 470 it into register space 409, and store 470 it into register or memory space allocated to VMCS 404. After the new page-table pointer-address is loaded, the translations for the guest software are now translated using page table hierarchy 415 rather than page table hierarchy 410 (that is, the guest address space has been switched).

Although the above discussion has been directed to a guest address switching service implemented in CPU hardware, other services provided by a VMM may also be integrated into the CPU. These include but are not limited to the following: 1) mapping or unmapping specific regions of memory with certain permissions; 2) processing a virtual interrupt in a specific way (e.g., defining operating characteristics of a virtual interrupt controller); 3) pinning memory to be used as I/O buffers. Note that items 1) and 3) above as well as the guest address space switching function all change a memory configuration.

Figure 5:
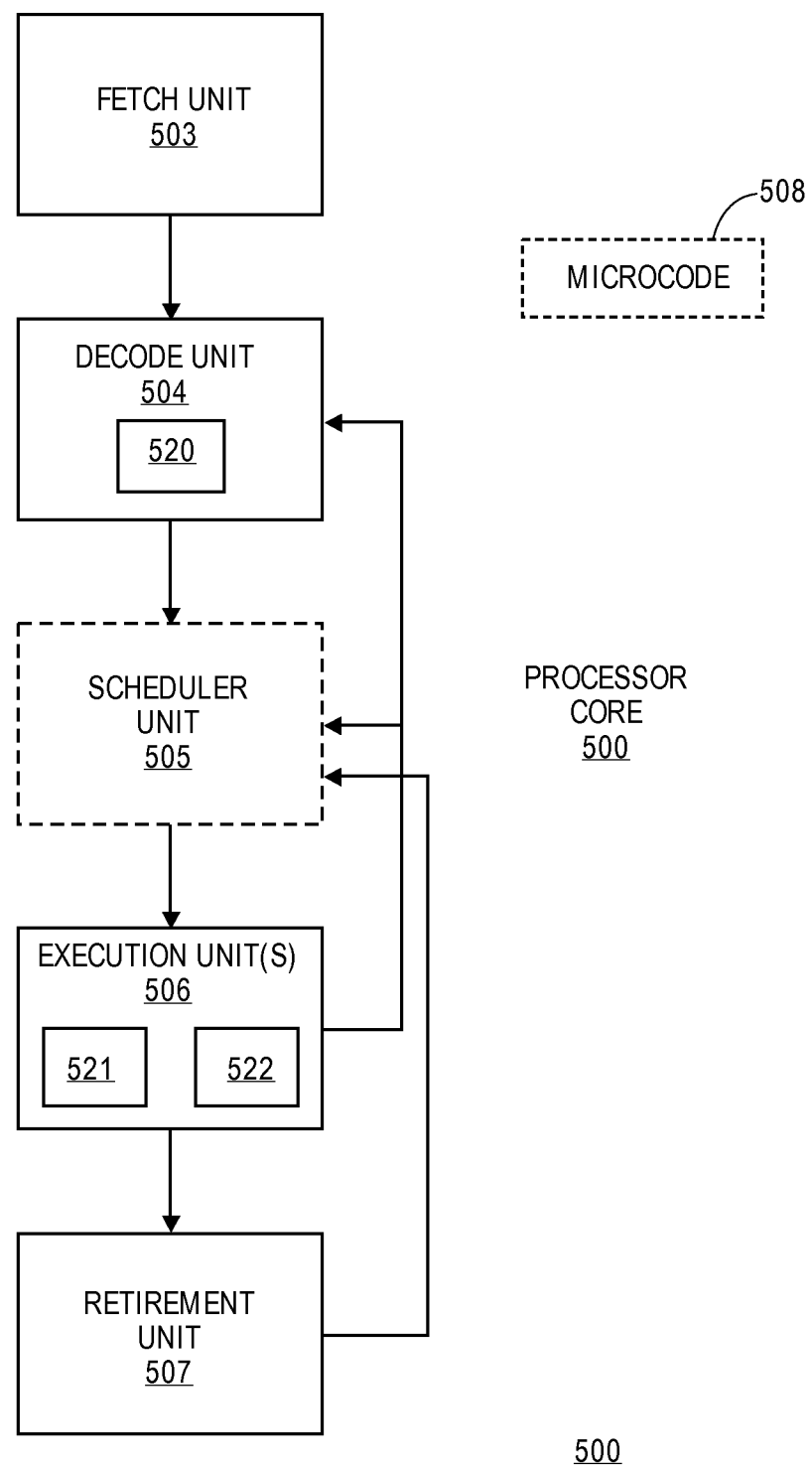
FIG. 5 shows an embodiment of a processor.

FIG. 5 shows a generic processing core 500 that is believed to describe many different types of processing core architectures such as Complex Instruction Set (CISC), Reduced Instruction Set (RISC) and Very Long Instruction Word (VLIW). The generic processing core 500 of FIG. 5 includes: 1) a fetch unit 503 that fetches instructions (e.g., from cache or memory); 2) a decode unit 504 that decodes instructions; 3) a schedule unit 505 that determines the timing and/or order of instruction issuance to the execution units 506 (notably the scheduler is optional); 4) execution units 506 that execute the instructions; 5) a retirement unit 507 that signifies successful completion of an instruction. Notably, the processing core may or may not include microcode 508, partially or wholly, to control the micro operations of the execution units 506. The instruction execution resources/logic referred to in preceding discussions may be implemented with one or more of the execution units within execution units 506.

Figure 6:
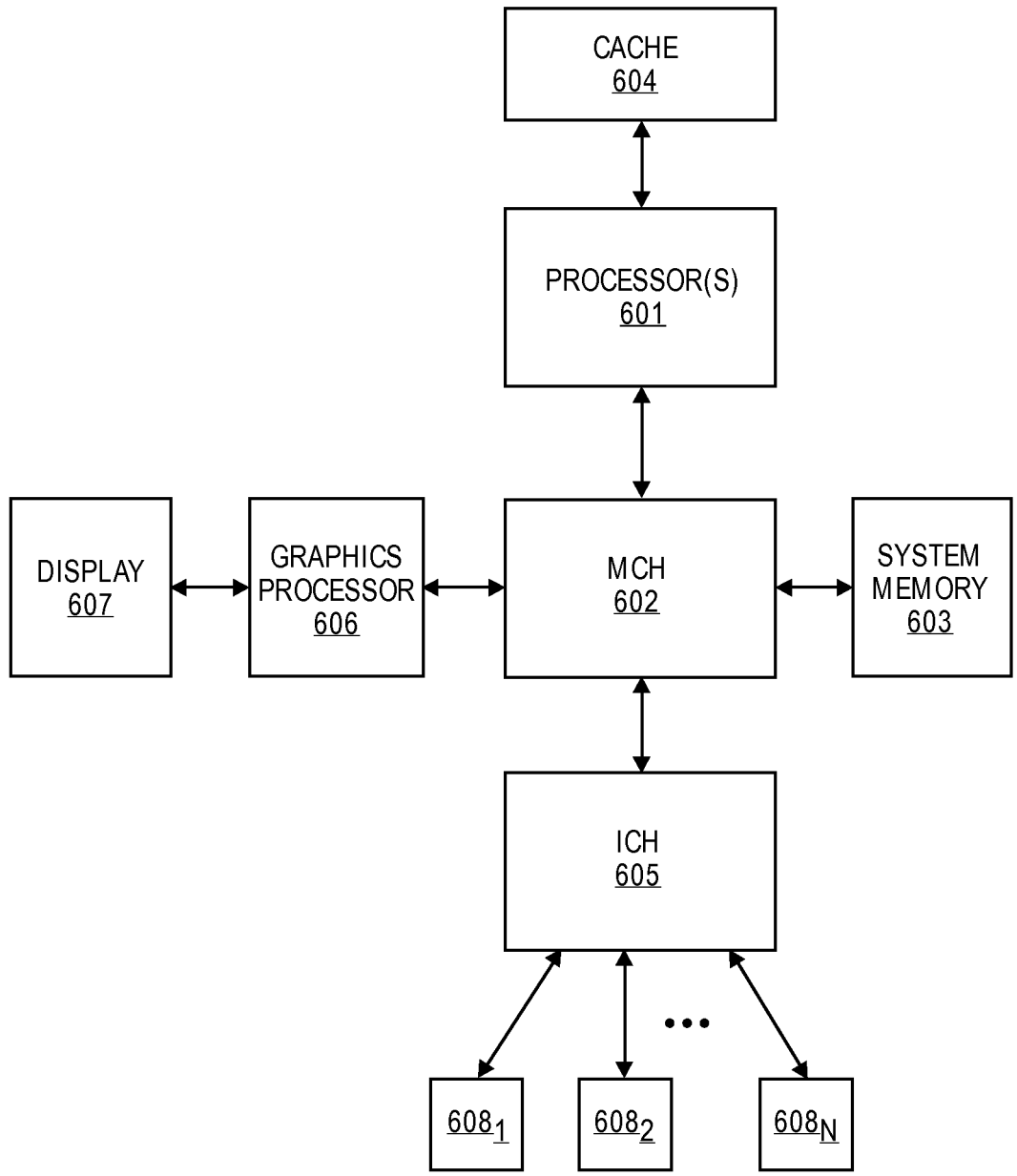
FIG. 6 shows an embodiment of a computing system.

A processing core having the functionality described above can be implemented into various computing systems as well. FIG. 6 shows an embodiment of a computing system (e.g., a computer). The exemplary computing system of FIG. 6 includes: 1) one or more processing cores 601 that may be designed to include two and three register scalar integer and vector instruction execution; 2) a memory control hub (MCH) 602; 3) a system memory 603 (of which different types exist such as DDR RAM, EDO RAM, etc); 4) a cache 604; 5) an I/O control hub (ICH) 605; 6) a graphics processor 606; 7) a display/screen 607 (of which different types exist such as Cathode Ray Tube (CRT), flat panel, Thin Film Transistor (TFT), Liquid Crystal Display (LCD), DPL, etc.) one or more I/O devices 608.

The one or more processing cores 601 execute instructions in order to perform whatever software routines the computing system implements. The instructions frequently involve some sort of operation performed upon data. Both data and instructions are stored in system memory 603 and cache 604. Cache 604 is typically designed to have shorter latency times than system memory 603. For example, cache 604 might be integrated onto the same silicon chip(s) as the processor(s) and/or constructed with faster SRAM cells whilst system memory 603 might be constructed with slower DRAM cells. By tending to store more frequently used instructions and data in the cache 604 as opposed to the system memory 603, the overall performance efficiency of the computing system improves.

System memory 603 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 603 prior to their being operated upon by the one or more processor(s) 601 in the implementation of a software program. Similarly, data that a software program determines should be sent from the computing system to an outside entity through one of the computing system interfaces, or stored into an internal storage element, is often temporarily queued in system memory 603 prior to its being transmitted or stored.

The ICH 605 is responsible for ensuring that such data is properly passed between the system memory 603 and its appropriate corresponding computing system interface (and internal storage device if the computing system is so designed). The MCH 602 is responsible for managing the various contending requests for system memory 603 access amongst the processor(s) 601, interfaces and internal storage elements that may proximately arise in time with respect to one another.

One or more I/O devices 608 are also implemented in a typical computing system. I/O devices generally are responsible for transferring data to and/or from the computing system (e.g., a networking adapter); or, for large scale non-volatile storage within the computing system (e.g., hard disk drive). ICH 605 has bi-directional point-to-point links between itself and the observed I/O devices 608.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims.

What is claimed is:

1. A method performed by a processor comprising:
    writing, into a virtual machine control structure (VMCS), an indication that an instruction is enabled for a guest software instance on a virtual machine of the processor, and a plurality of services the processor is to perform without exiting the virtual machine;
    loading, upon entry into the virtual machine, the indication from the VMCS into register space of the processor;
    receiving a request from the guest software instance of the virtual machine, to perform the instruction;
    decoding the instruction into a decoded instruction with a decode unit of the processor; and
    executing the decoded instruction with an execution unit of the processor to:
        check if the instruction, requested for execution by the guest software instance on the virtual machine of the processor, is enabled for the guest software instance by reading the register space,
        check if a service requested by the guest software instance on the virtual machine of the processor is one of the plurality of services the processor is to perform without exiting the virtual machine by reading the register space, wherein the plurality of services comprises at least one non-interrupt service the processor is to perform without exiting the virtual machine, and
        perform the service without exiting the virtual machine if the instruction is enabled for the guest software instance and the service is one of the plurality of services.

2. The method of claim 1, wherein the register space of the processor comprises a private control register space of the processor.

3. The method of claim 1, wherein the check of the service comprises the guest software instance loading a value that identifies the service requested into a register of the processor.

4. The method of claim 3, wherein the check of the service further comprises comparing configuration information for the plurality of services the processor is to perform without exiting the virtual machine for the guest software instance in the register space of the processor with the value.

5. The method of claim 1, wherein the check of the service comprises the guest software instance loading a value that identifies the service requested into a memory of the processor.

6. The method of claim 5, wherein the check of the service further comprises comparing configuration information for the plurality of services the processor is to perform without exiting the virtual machine for the guest software instance in the register space of the processor with the value.

7. The method of claim 1, wherein the plurality of services comprises a plurality of non-interrupt services the processor is to perform without exiting the virtual machine.

8. A processor comprising:
a decode unit to decode an instruction into a decoded instruction in response to receiving a request from a guest software instance to perform the instruction; and
an execution unit to execute the decoded instruction to:
check if the instruction, requested for execution by the guest software instance on a virtual machine of the processor, is enabled for the guest software instance by reading a register space of the processor,
check if a service requested by the guest software instance on the virtual machine of the processor is one of a plurality of services the processor is to perform without exiting the virtual machine by reading the register space, wherein the plurality of services comprises at least one non-interrupt service the processor is to perform without exiting the virtual machine, and
perform the service without exiting the virtual machine if the instruction is enabled for the guest software instance and the service is one of the plurality of services, wherein a virtual machine control structure (VMCS) is to store an indication that the instruction is enabled for the guest software instance on the virtual machine of the processor, and the plurality of services the processor is to perform without exiting the virtual machine, and the indication is loaded into the register space of the processor from the VMCS upon entry into the virtual machine.

9. The processor of claim 8, wherein the register space of the processor comprises a private control register space of the processor.

10. The processor of claim 8, wherein the check of the service comprises the guest software instance to load a value that identifies the service requested into a register of the processor.

11. The processor of claim 10, wherein the check of the service further comprises a comparison of configuration information for the plurality of services the processor is to perform without exiting the virtual machine for the guest software instance in the register space of the processor with the value.

12. The processor of claim 8, wherein the check of the service comprises the guest software instance to load a value that identifies the service requested into a memory of the processor.

13. The processor of claim 12, wherein the check of the service further comprises a comparison of configuration information for the plurality of services the processor is to perform without exiting the virtual machine for the guest software instance in the register space of the processor with the value.

14. The processor of claim 8, wherein the plurality of services comprises a plurality of non-interrupt services the processor is to perform without exiting the virtual machine.

15. A non-transitory machine readable medium containing stored program code that when processed by a machine causes a method to be performed, said method comprising:
writing, into a virtual machine control structure (VMCS), an indication that an instruction is enabled for a guest software instance on a virtual machine of the processor, and a plurality of services the processor is to perform without exiting the virtual machine;
loading, upon entry into the virtual machine, the indication from the VMCS into register space of the processor;
receiving a request from the guest software instance of the virtual machine, to perform the instruction;
decoding the instruction into a decoded instruction with a decode unit of a processor; and executing the decoded instruction with an execution unit of the processor to:
check if the instruction, requested for execution by the guest software instance on the virtual machine of the processor, is enabled for the guest software instance by reading the register space,
check if a service requested by the guest software instance on the virtual machine of the processor is one of the plurality of services the processor is to perform without exiting the virtual machine by reading the register space, wherein the plurality of services comprises at least one non-interrupt service the processor is to perform without exiting the virtual machine, and
perform the service without exiting the virtual machine if the instruction is enabled for the guest software instance and the service is one of the plurality of services.

16. The non-transitory machine readable medium of claim 15, wherein the register space of the processor comprises a private control register space of the processor.

17. The non-transitory machine readable medium of claim 15, wherein the check of the service comprises the guest software instance loading a value that identifies the service requested into a register of the processor.

18. The non-transitory machine readable medium of claim 17, wherein the check of the service further comprises comparing configuration information for the plurality of services the processor is to perform without exiting the virtual machine for the guest software instance in the register space of the processor with the value.

19. The non-transitory machine readable medium of claim 15, wherein the check of the service comprises the guest software instance loading a value that identifies the service requested into a memory of the processor.

20. The non-transitory machine readable medium of claim 19, wherein the check of the service further comprises comparing configuration information for the plurality of services the processor is to perform without exiting the virtual machine for the guest software instance in the register space of the processor with the value.

21. The non-transitory machine readable medium of claim 15, wherein the plurality of services comprises a plurality of non-interrupt services the processor is to perform without exiting the virtual machine.

* * * * *